United States Patent
Nyamu et al.

(10) Patent No.: US 8,240,974 B2
(45) Date of Patent: Aug. 14, 2012

(54) COLD AIR BUFFER SUPPLY TUBE

(75) Inventors: Kinyua N. Nyamu, New Britain, CT (US); Ken Yacono, West Stafford, CT (US)

(73) Assignee: United Technologies Corporation, Hartford, CT (US)

( * ) Notice: Subject to any disclaimer, the term of this patent is extended or adjusted under 35 U.S.C. 154(b) by 1459 days.

(21) Appl. No.: 12/052,768

(22) Filed: Mar. 21, 2008

(65) Prior Publication Data

US 2009/0238678 A1    Sep. 24, 2009

(51) Int. Cl.
*F04D 27/02* (2006.01)
*F04D 29/58* (2006.01)
*F01D 25/12* (2006.01)

(52) U.S. Cl. ............. 415/1; 415/111; 415/116; 415/175

(58) Field of Classification Search .................. 415/111, 415/112, 115, 116, 175, 191
See application file for complete search history.

(56) References Cited

U.S. PATENT DOCUMENTS

| | | | | |
|---|---|---|---|---|
| 4,156,342 A * | 5/1979 | Korta et al. | ................... | 60/39.08 |
| 4,542,623 A * | 9/1985 | Hovan et al. | ................... | 60/226.1 |
| 4,561,246 A | 12/1985 | Hovan | | |
| 4,574,584 A | 3/1986 | Hovan | | |
| 4,645,415 A | 2/1987 | Hovan | | |
| 5,526,640 A | 6/1996 | Brooks | | |
| 6,767,182 B2 * | 7/2004 | Coppola | ................... | 415/115 |
| 6,843,059 B2 | 1/2005 | Burrus | | |
| 6,910,852 B2 | 6/2005 | Simeone | | |
| 7,156,618 B2 | 1/2007 | Fish | | |
| 2007/0116562 A1 | 5/2007 | West | | |
| 2007/0119145 A1 | 5/2007 | O'Neill | | |

* cited by examiner

*Primary Examiner* — Edward Look
*Assistant Examiner* — Jason Davis
(74) *Attorney, Agent, or Firm* — Carlson, Gaskey & Olds, PC

(57) ABSTRACT

A cold air buffer supply tube for a gas turbine engine includes a tube body having a first tube end and a second tube end. A fitting is secured to the first tube end, and a metering cap is secured to the tube second end. The metering cap includes a cap body having a peripheral wall with a plurality of holes to direct flow from an air supply into a bearing compartment for the gas turbine engine.

24 Claims, 4 Drawing Sheets

COLD AIR BUFFER SUPPLY TUBE

BACKGROUND OF THE INVENTION

This disclosure relates to a cold air buffer supply tube for a gas turbine engine.

A gas turbine engine includes a compressor section, a combustion section, and a diffuser positioned downstream of the compressor section and near a beginning of the combustion section. A cold air buffer supply tube is used to direct cooling air from an air supply through the diffuser housing and into a bearing compartment. The cold air buffer supply tube includes a tube body with a first fitting at one end that is coupled to an external tube, and a second fitting at an opposite end. The second fitting includes a nut, washer, and nipple that are secured to the tube body.

A baffle is welded to an opening formed within a bearing housing that defines the bearing compartment. The cold air buffer supply tube is then inserted through the baffle to direct air into the bearing compartment. Air flows out of a single tip opening formed in the nipple.

The current cold air buffer supply tube is comprised of a significant number of parts, which can be difficult and time consuming to assemble. Further, the baffle can break loose from the bearing housing, potentially damaging buffer shields located nearby. Once a baffle has broken loose, there is potential for leakage of hot air into a bearing cooling system, which could adversely affect bearing life. Also, under certain conditions, the tube coupling nut can back off, subsequently damaging the tube, and again potentially opening a leak path for hot air.

Accordingly, there is a need to provide a lubrication system that can precisely lubricate the bearings and seal plate, as well as addressing the other short comings discussed above.

SUMMARY OF THE INVENTION

An example cold air buffer supply tube for a gas turbine engine includes a tube body having a first tube end and a second tube end. A fitting is secured to the first tube end, and a metering cap is secured to the tube second end. The metering cap includes a cap body having a peripheral wall with a plurality of holes to direct flow into a bearing compartment for the gas turbine engine.

In one example, the cold air buffer supply tube is directly threaded to a bearing housing that defines the bearing compartment. In one example, the metering cap includes a threaded outer portion that is attached to the bearing housing.

In one example, the cap body of the metering cap comprises a cup-shaped body with a solid distal end face, an open face in fluid communication with the tube body, and with the peripheral wall extending from the distal end face to the open face. When attached to the tube body, the peripheral wall and distal end face cooperate to define an internal cavity. The plurality of holes is formed within the peripheral wall, with each hole being spaced apart from each other about a central axis defined by the tube body. The holes direct air from the internal cavity into the bearing compartment.

In one example, the fitting and the metering cap are attached to the tube body at brazed attachment interfaces between the fitting and tube body and between the metering cap and tube body, respectively. The fitting is to be coupled to an external tube. As such, the tube body, the fitting, and the metering cap form a single-piece tube assembly that is installed within the gas turbine engine as a unit.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
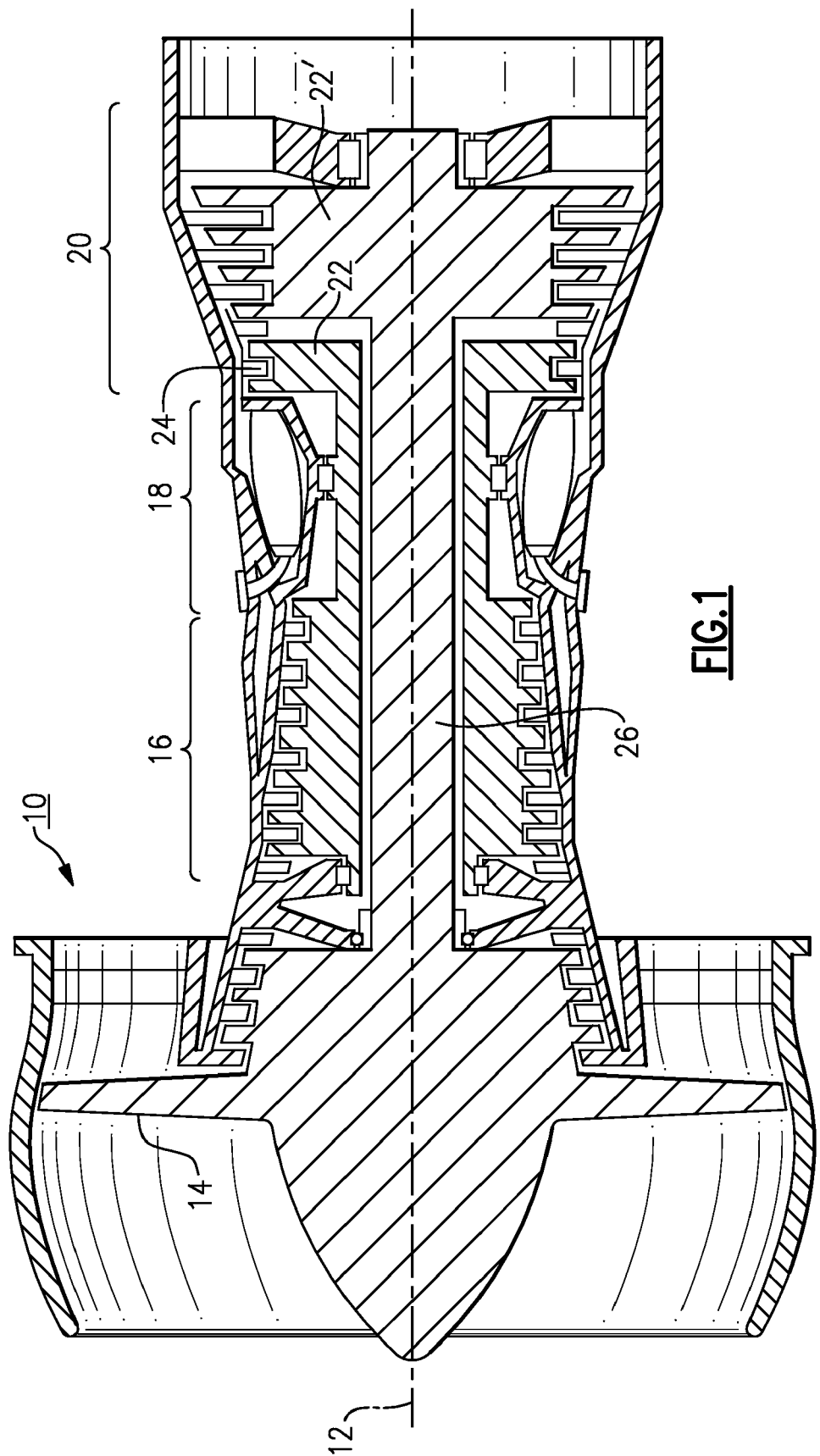
FIG. 1 is a schematic view of a cross-section of a gas turbine engine.

FIG. 1 illustrates selected portions of an example gas turbine engine 10, such as a turbofan gas turbine engine used for propulsion. In this example, the turbine engine 10 is circumferentially disposed about an engine centerline 12. The gas turbine engine 10 includes a fan 14, a compressor section 16, a combustion section 18, and a turbine section 20. The combustion section 18 and the turbine section 20 include corresponding blades 22, 22' and vanes 24. A rotor shaft 26 is associated with the fan 14 and the blades 22'. As is known, air compressed in the compressor section 16 is mixed with fuel and burned in the combustion section 18 to produce hot gasses that are expanded in the turbine section 20. FIG. 1 is a somewhat schematic presentation for illustrative purposes only and is not a limitation on the disclosed examples. Additionally, there are various types of gas turbine engines, many of which could benefit from the examples disclosed herein and are not limited to the designs shown.

Figure 2:
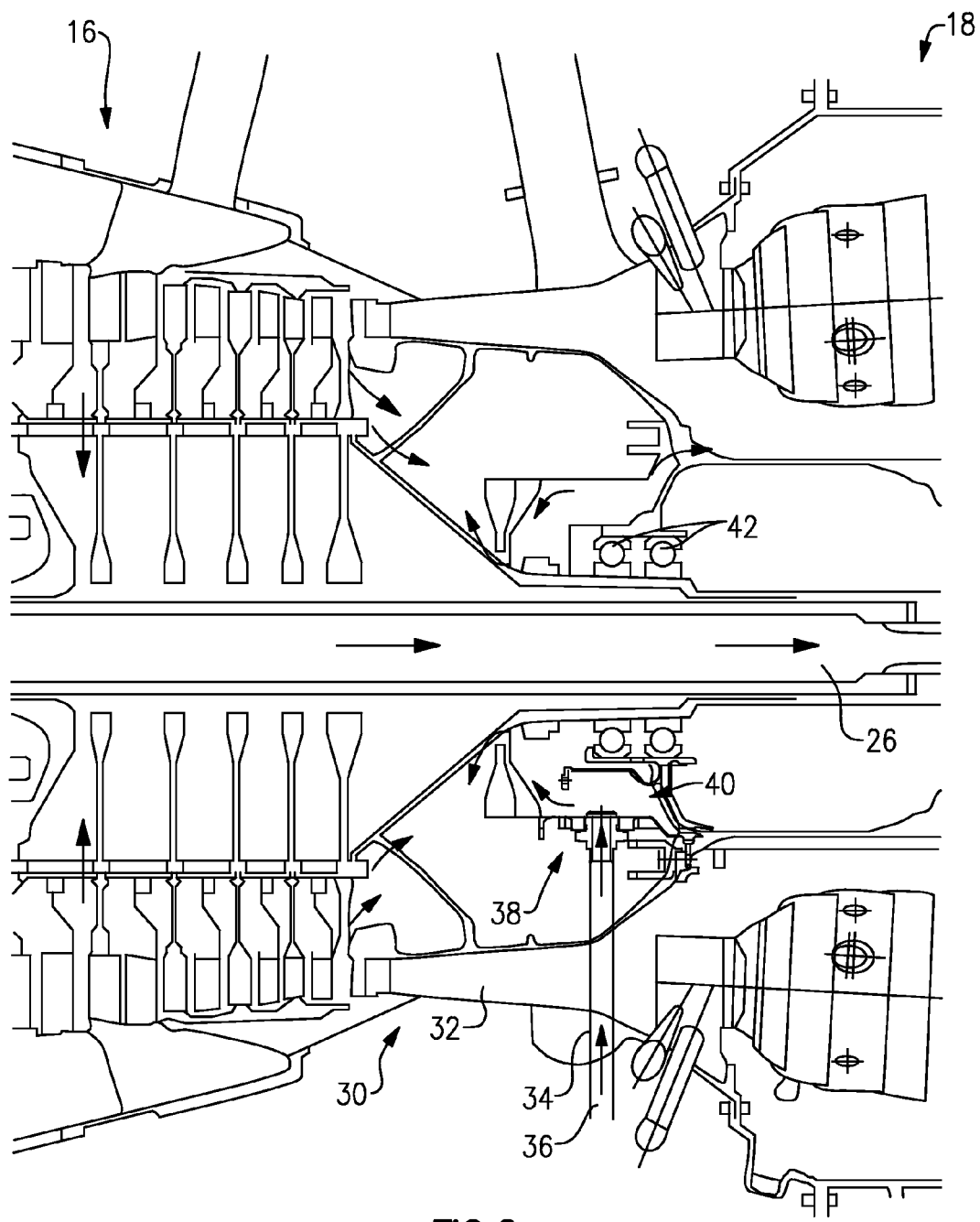
FIG. 2 is a schematic view of a partial cross-section of a portion of a gas turbine engine between compressor and combustion sections.

FIG. 2 schematically illustrates a portion of the gas turbine engine 10 that is located between the compressor section 16 and a beginning of the combustion section 18. A diffuser 30 is positioned at this location to expand the flow of air having passed through the compressor section 16. The diffuser 30 includes an outer casing or housing 32 that has an opening 34 to receive a cold air buffer supply tube 36.

Adjacent to the housing 32 is a radially inner bearing housing 38 that defines a bearing compartment 40. Bearings 42 are supported by the bearing housing 38. The bearing housing 38 includes an opening 44 (shown in FIG. 4) that receives the cold air buffer supply tube 36. The cold air buffer supply tube 36 directs air into the bearing compartment 40 to cool the bearings 42 and other associated components in this location. In one example, the cold air buffer supply tube 36 is directly attached to the bearing housing 38 at a threaded attachment interface; however, any other suitable attachment interface could also be used such as a press-fit for example.

Figure 3:
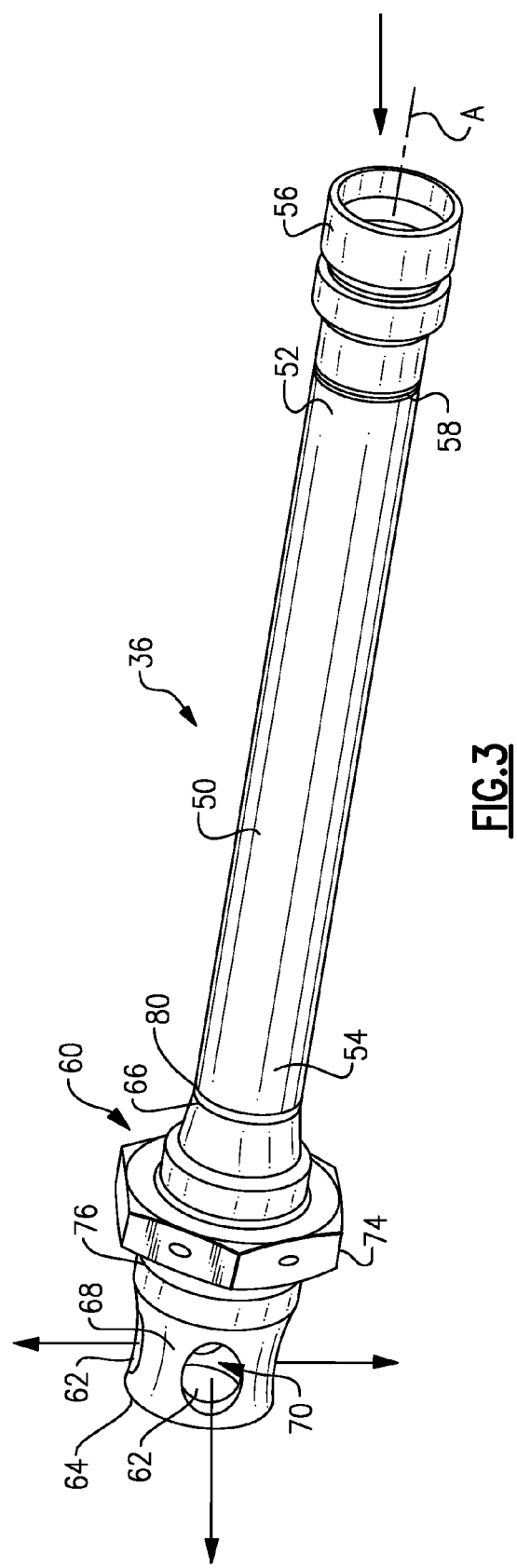
FIG. 3 is a perspective view of a cold air buffer supply tube.

The cold air buffer supply tube 36 is shown in greater detail in FIG. 3. The cold air buffer supply tube 36 includes a tube body 50 defining an internal cavity 49 (shown in FIG. 5). The tube body 50 has a first tube end 52 and a second tube end 54. A fitting 56 is attached to the first tube end 52. In one example, the fitting 56 is attached to the tube body 50 at a first brazed attachment interface 58. The fitting 56 is to be connected to an external tube associated with an air supply. The fitting 56 can be connected to the external tube via any suitable connection interface.

A metering cap 60 is attached to the second tube end 54 of the tube body 50. In the example shown, the tube body 50 is fabricated from a nickel alloy material and the metering cap 60 and fitting 56 are fabricated from a stainless steel material It should be appreciated by one of ordinary skill in the art that other types of materials could also be used. The metering cap 60 includes a plurality of holes 62 that direct flow into the bearing compartment 40 (shown in FIG. 4). The metering cap 60 comprises a cup-shaped body having a solid distal end face 64, an opposite open end face 66, and a peripheral wall 68 that extends from the solid end face 64 to the open end face 66. When the metering cap 60 is attached to the tube body 50, the peripheral wall 68 and the solid end face 64 cooperate to define an internal cavity 70 that is in fluid communication with the tube body 50. Attachment of the metering cap 60 to the tube body 50 will be discussed in detail below.

The holes 62 are formed in the peripheral wall 68 which surrounds a longitudinal axis A of the tube body 50. The holes 62 are circumferentially spaced apart from each other about the central axis A. The holes 62 facilitate directing flow from the internal cavity 70 into the bearing compartment 40 when the buffer supply tube 36 is attached to the bearing housing 38. In the example shown, the metering cap 60 includes four holes 62 that are generally equally spaced apart from each other about the longitudinal axis A. The holes 62 are shaped to provide a desired flow rate into the bearing compartment 40. Although four equally spaced holes are shown, it should be appreciated that other numbers, shapes, and spacing of holes could be formed within the metering cap 60.

The metering cap 60 also includes an enlarged diameter portion 74 that is formed about the peripheral wall 68. The enlarged diameter portion 74 comprises a stop surface that engages the bearing housing 38 to properly position the plurality of holes 62 within the bearing compartment 40. A threaded surface 76 is formed on a radially outer surface of the peripheral wall 68, and is positioned axially between the enlarged diameter portion 74 and the holes 62. The metering cap 60 is attached to the tube body 50 at a second brazed attachment interface 80. The fitting 56 is attached to the tube body 50 at the first brazed attachment interface 58. Thus, the cold buffer supply tube 36 includes the tube body 50, the metering cap 60, and the fitting 56 assembled to form a single-piece tube assembly that is installable in the gas turbine engine 10 as a unit.

Figure 5:
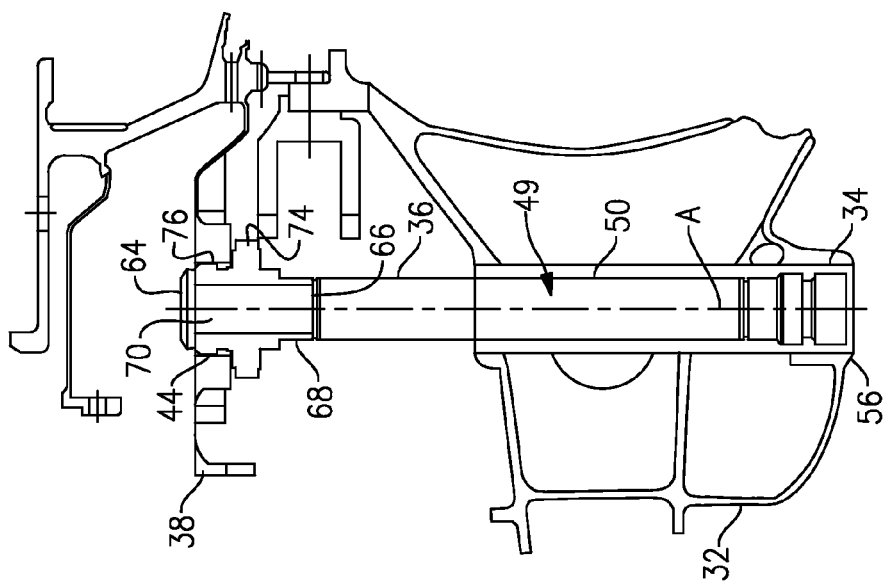
FIG. 5 is a cross-sectional view of the cold air buffer supply tube, bearing housing, and diffuser case.
Figure 4:
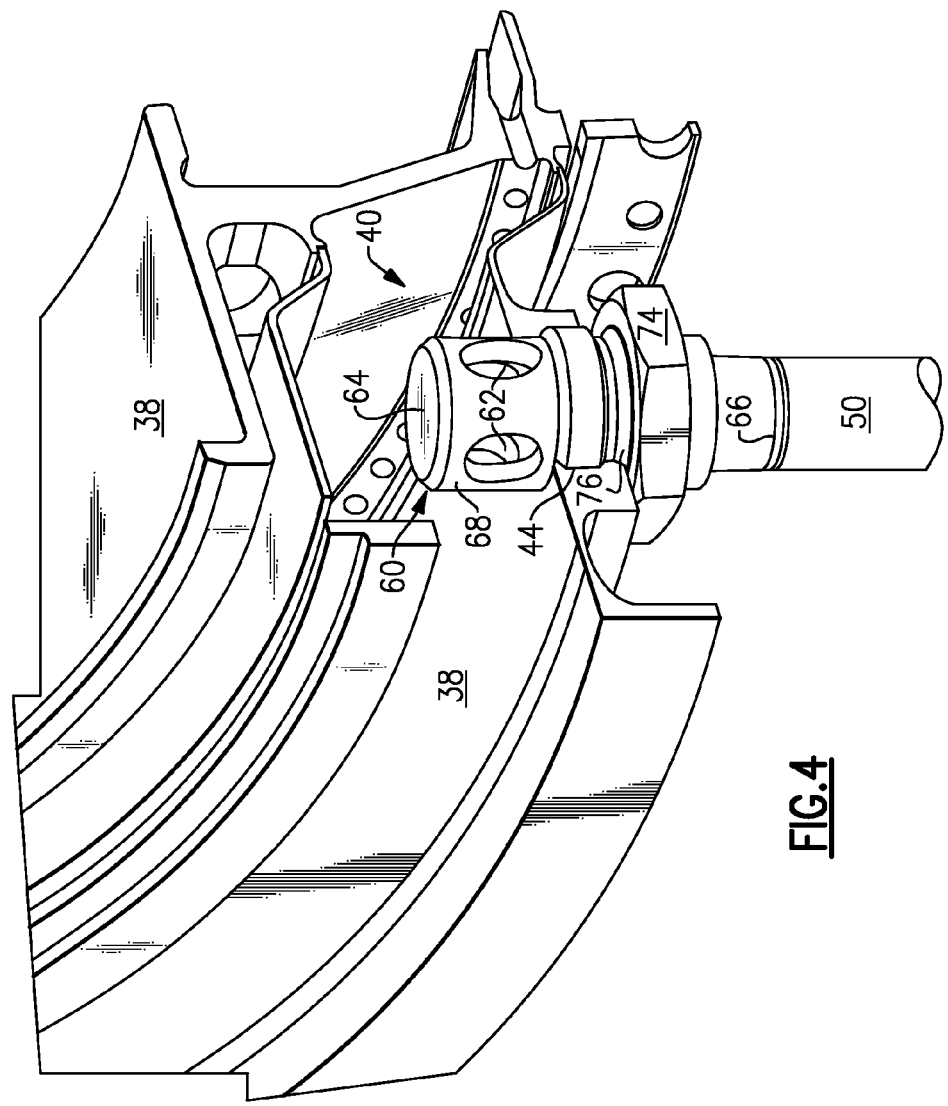
FIG. 4 is a perspective view, partially cut-away, of the cold air buffer supply tube of FIG. 3 installed in a bearing housing.

As shown in FIGS. 4 and 5, the bearing housing 38 is positioned at a desired location relative to the diffuser housing 32. During installation, the cold air buffer supply tube 36 is first installed in the opening 34 by inserting the cold air buffer supply tube 36 in an inward direction into the diffuser housing 32. The cold air buffer supply tube 36 is then threaded into direct engagement with the bearing housing 38 at the opening 44. More specifically, the threaded surface 76 is threaded into engagement with the bearing housing 38 until the enlarged diameter portion 74 contacts the bearing housing 38. As a result of the engagement, the holes 62 of the metering cap 60 are orientated in a desired position within the bearing compartment 40 such that the flow can be directed to desired locations.

It should be appreciated that other types of attachment interfaces could be used for the various components. Further, the order of assembly steps can be varied as needed. The single-piece cold air buffer supply tube is easily installed in a direct threaded attachment to the bearing housing compared to multi-piece configurations where components must be separately installed.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A cold air buffer supply tube for a gas turbine engine comprising:
    a tube body having a first tube end and a second tube end;
    a fitting secured to said first tube end;
    a metering cap secured to said second tube end, said metering cap having a cap body with a peripheral wall that includes a plurality of holes to direct flow into a bearing compartment for the gas turbine engine.

2. The cold air buffer supply tube according to claim 1 wherein said cap body comprises a cup-shaped body having a distal end face and an open end that is in fluid communication with said tube body.

3. The cold air buffer supply tube according to claim 2 wherein said peripheral wall extends from said distal end face to said open end, said plurality of holes being formed within said peripheral wall and spaced apart from each other.

4. The cold air buffer supply tube according to claim 3 wherein said tube body defines a center axis and wherein said peripheral wall surrounds said center axis, said plurality of holes being spaced apart from each other about said central axis.

5. The cold air buffer supply tube according to claim 4 wherein said plurality of holes comprises at least four holes that are generally equally spaced apart from each other about said central axis.

6. The cold air buffer supply tube according to claim 3 wherein said metering cap includes a threaded surface formed about an outer periphery of said peripheral wall and an enlarged diameter portion comprising a stop surface to engage a bearing housing to properly position said plurality of holes within the bearing compartment.

7. The cold air buffer supply tube according to claim 6 wherein said threaded surface is positioned axially between said plurality of holes and said enlarged diameter portion.

8. The cold air buffer supply tube according to claim 1 wherein said metering cap includes a threaded outer surface that when installed is to directly engage a bearing housing that defines the bearing compartment.

9. The cold air buffer supply tube according to claim 1 wherein said metering cap is attached to said tube body at a brazed attachment interface between said metering cap and said tube body.

10. The cold air buffer supply tube according to claim 1 wherein said fitting is attached to said tube body at a brazed attachment interface between said tube body and said fitting, said fitting to be connected to an external tube.

11. The cold air buffer supply tube according to claim 1 wherein said metering cap is configured to be attached directly to a bearing housing that defines said bearing compartment, and wherein said tube body extends from said bearing housing in a substantially radial direction relative to a centerline of the gas turbine engine.

12. The cold air buffer supply tube according to claim 11 wherein said cap body comprises a cup-shaped body having a solid distal end face and an open end face opposite said solid distal end face, and wherein said peripheral wall extends between said solid distal end face and said open end face, and wherein said metering cap includes an enlarged diameter portion that comprises a stop surface that is configured to contact said bearing housing when installed in the gas turbine engine.

13. A gas turbine engine comprising:
   a fan section;
   a compressor;
   a diffuser positioned downstream of said compressor, said diffuser including a diffuser housing with a first opening;
   a bearing housing positioned adjacent to said diffuser housing, said bearing housing including a second opening;
   a cold air buffer supply tube extending through said first and said second openings, said cold air buffer supply tube including a tube body with first and second tube ends, a fitting attached to said first tube end, and a metering cap attached to said second tube end, and wherein said metering cap has a cap body with a peripheral wall that includes a plurality of holes to direct flow into a bearing compartment defined by said bearing housing;
   a combustor positioned downstream of said diffuser; and
   a turbine section.

14. The gas turbine engine according to claim 13 wherein said metering cap includes a threaded outer surface that is directly threaded to said bearing housing when installed.

15. The gas turbine engine according to claim 13 wherein said cold air buffer supply tube defines a central axis and said cap body comprises a cup-shaped body having a solid distal end face and an open end that is in fluid communication with said tube body such that an internal cavity is defined within said metering cap, and wherein said peripheral wall surrounds said central axis and extends from said solid distal end face to said open end, and wherein said plurality of holes are formed within said peripheral wall and are spaced apart from each other about said central axis, said plurality of holes defining flow paths from said internal cavity to said bearing compartment.

16. The gas turbine engine according to claim 13 wherein said fitting is attached to said first tube end at a first brazed attachment interface between said fitting and said tube body and said metering cap is attached to said second tube end at a second brazed attachment interface between said metering cap and said tube body such that said tube body, said fitting, and said metering cap form a single-piece tube assembly that is installable within the gas turbine engine as a unit.

17. The gas turbine engine according to claim 13 wherein said cold air buffer supply tube is attached directly to said bearing housing such that said tube body extends from said bearing housing in a substantially radial direction relative to a centerline of the gas turbine engine.

18. The gas turbine engine according to claim 13 wherein said cap body comprises a cup-shaped body having a solid distal end face and an open end face opposite said solid distal end face, and wherein said peripheral wall extends between said solid distal end face and said open end face, and wherein said metering cap includes an enlarged diameter portion that comprises a stop surface that contacts said bearing housing when installed in the gas turbine engine.

19. A method of assembling a cold air buffer supply tube into a gas turbine engine comprising the steps of:
   (a) inserting a cold air buffer supply tube through an inner diameter opening in a diffuser housing, the cold air buffer supply tube having a metering cap with a cap body having a peripheral wall with a plurality of holes;
   (b) positioning a bearing housing in a desired position relative to the diffuser housing; and
   (c) threading the cold air buffer supply tube into direct engagement with the bearing housing.

20. The method according to claim 19 including forming the cold air buffer supply tube with a tube body having first and second tube ends, attaching a fitting to the first tube end, and attaching the metering cap to the second tube end to form a single tube assembly and wherein the single tube assembly is assembled as a unit prior to step (a).

21. The method according to claim 20 including forming the cap body of the metering cap as a cup-shaped body having a distal end face and an open end that is in fluid communication with the tube body with the peripheral wall extending from the distal end face to the open end, and with the plurality of holes being formed within the peripheral wall and circumferentially spaced apart from each other, and forming a threaded surface on an outer peripheral surface of the metering cap, and wherein step (c) includes threading the metering cap into engagement with the bearing housing such that the plurality of holes are positioned to direct flow into a bearing compartment defined by the bearing housing.

22. The method according to claim 20 including brazing the fitting to the first tube end and brazing the metering cap to the second tube end.

23. The method according to claim 20 including forming the cap body as a cup-shaped body having a solid distal end face and an open end face opposite the solid distal end face, and wherein the peripheral wall extends between the solid distal end face and the open end face, and including forming the metering cap to include an enlarged diameter portion that comprises a stop surface, and wherein step (c) includes threading the cold air buffer supply tube into direct engagement with the bearing housing until the stop surface of the enlarged diameter portion contacts the bearing housing.

24. The method according to claim 19 wherein step (c) includes positioning the cold air buffer supply tube to extend in a substantially radial direction relative to a centerline of the gas turbine engine.

* * * * *